United States Patent

[11] 3,609,317

[72] Inventor William Siebert, Jr.
Santa Clara County, Calif.

[21] Appl. No. 6,876
[22] Filed Jan. 29, 1970
[45] Patented Sept. 28, 1971
[73] Assignee Varian Associates
Palo Alto, Calif.

[54] VARIABLE FREQUENCY AUDIO FREQUENCY MODULATOR FOR R.F. SPECTROMETER
6 Claims, 13 Drawing Figs.

[52] U.S. Cl. .......... 235/151.3, 324/.5
[51] Int. Cl. .......... G01n 27/78, G01r 33/08
[50] Field of Search .......... 324/.5 A, .5 AC, .5 AH; 235/151.3; 328/39, 40, 41, 42

[56] References Cited

UNITED STATES PATENTS

| | | | |
|---|---|---|---|
| 3,496,454 | 2/1970 | Nelson .......... | 324/.5 |
| 3,500,178 | 3/1970 | Paitich et al. .......... | 324/.5 |

*Primary Examiner*—Malcolm A. Morrison
*Assistant Examiner*—Edward J. Wise
*Attorneys*—Stanley Z. Cole and Vincent W. Cleary

ABSTRACT: The radio frequency spectrometer is disclosed employing a variable frequency audio frequency field modulator for producing a variable frequency sideband which can be stepped through the resonance line under analysis in precisely controlled small audio frequency increments under the control of a digital computer. The precisely controlled audio frequency for the modulator is derived from a radio frequency crystal and is divided by a certain divisor as determined by a computer which feeds the number into a counter which serves as the divider. The quotient output of the divider is employed to trigger a square wave generator, the output of which is filtered to produce a sinusoidal audio frequency output which is fed to the field modulator. The computer calculates new divisors for each of the successive audio frequency outputs.

INVENTOR
WILLIAM SIEBERT JR.

BY [signature]
ATTORNEY

INVENTOR.
WILLIAM SIEBERT JR.
BY [signature]
ATTORNEY

INVENTOR
WILLIAM SIEBERT JR.
BY Vincent H Cleary
ATTORNEY

INVENTOR.
WILLIAM SIEBERT JR.
BY [signature]
ATTORNEY

VARIABLE FREQUENCY AUDIO FREQUENCY MODULATOR FOR R.F. SPECTROMETER

DESCRIPTION OF THE PRIOR ART

Heretofore, gyromagnetic resonance spectrometers have been built employing a frequency scan of resonance lines wherein the scanned frequency was derived from a frequency synthesizer. Such a spectrometer is described in an article titled "Frequency Swept and Proton Stabilized NMR Spectrometer for All Nuclei Using a Frequency Synthesizer," by Baker & Burd appearing in the "Review of Scientific Instruments," Volume 34, No. 3, of Mar. 1963, see pages 238–242. The problem with the use of such a frequency synthesizer is that it is relatively expensive, as it involves multiplying and dividing a reference frequency by certain predetermined values in order to obtain the desired output frequency.

In another prior art spectrometer, the scanned radio frequency for exiting resonance of the sample under investigation was derived from an RF generator in such a manner that the radio frequency reference was divided in a frequency divider, such as a counter, to obtain a quotient signal which was compared with a second quotient signal derived from a tracking RF generator to derive an error signal for causing the second RF generator to track the first RF generator by a predetermined offset frequency. In this manner the spectrometer could be locked to a first resonance line and the tracking offset frequency was employed for observing resonance of a second resonance line. Means were provided for scanning the offset frequency through the resonance line. Such a spectrometer is described and claimed in copending U.S. application Ser. No. 679,373 filed Oct. 27, 1967 and assigned to the same assignee as the present invention. While the latter spectrometer system is especially desirable for heteronuclear resonance studies, it is not particularly suited for homonuclear studies where it is desired to provide a frequency scanned spectrometer wherein a sideband is stepped in very precisely controlled small increments through resonance lines under analysis.

SUMMARY OF THE PRESENT INVENTION

The principal object of the present invention is the provision of an improved radio frequency spectrometer.

One feature of the present invention is the provision, in a radio frequency spectrometer, of a variable frequency audio frequency field modulator that is precisely controlled as regards its audio frequency output and which employs a computer for calculating a divisor which it inserts into a counter for counting a stable radio frequency dividend signal to obtain an audio frequency quotient output determinative of the audio frequency output of the field modulator, whereby an extremely precise audio modulation frequency is obtained, such frequency being steppable in predetermined discrete increments in accordance with a program fed to the computer.

Another feature of the present invention is the same as the preceding feature wherein a register is coupled between the computer and the counter such that the divisors are sequentially stored in the register and sequentially transferred into the counter upon the completion of each of the counting cycles of the counter.

Another feature of the present invention is the same as any one or more of the preceding features including the provision of a square wave generator triggered by the audio frequency quotient output of the counter, the output of the square wave generator being of a frequency determined by the quotient output of the counter and such square wave output being filtered in a low pass filter to remove harmonics to provide a sinusoidal audio frequency output to the field modulator.

Another feature of the present invention is the same as any one or more of the preceding features wherein the computer calculates a set of two divisors which are alternately transferred into the counter to produce two sets of time displaced quotient outputs determinative of two time displaced audio signals of the same frequency, and including a selector for separating one set of quotient outputs from the other to produce a pair of separate time or phase displaced audio signals of the same frequency, whereby the computer can shift the phase of one audio signal relative to the other in a precise predetermined manner.

Another feature of the present invention is the same as any one or more of the preceding features wherein the first dividend radio frequency reference is a sideband of a second dividend radio frequency reference signal, such sideband being steppable in small discrete predetermined frequency increments via the computer by dividing the second dividend by a certain divisor determined by the computer to derive a second audio frequency quotient which is mixed in a mixer with a sample of the second dividend to produce the radio frequency sideband serving as the first radio frequency dividend signal.

Other features and advantages of the present invention will become apparent upon a perusal of the following specification taken in connection with the accompanying drawings wherein,

DESCRIPTION OF THE PREFERRED EMBODIMENTS

Figure 1:
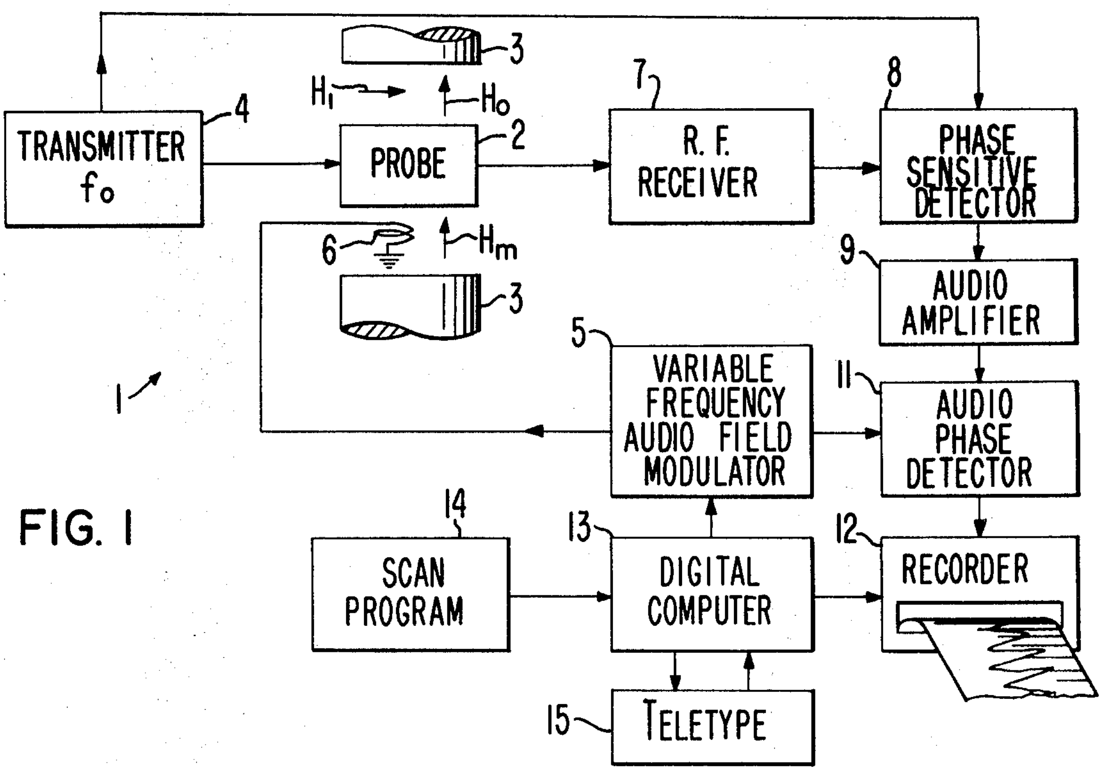
FIG. 1 is a schematic block diagram of a gyromagnetic resonance spectrometer incorporating features of the present invention.

Referring now to FIG. 1, there is shown a gyromagnetic resonance spectrometer 1 incorporating features of the present invention. Spectrometer 1 includes a probe assembly 2 for containing a sample of gyromagnetic bodies under analysis and for positioning the sample in a strong polarizing DC magnetic field $H_0$ produced between a pair of poles of a powerful magnet 3. A radio frequency transmitter 4 feeds radio frequency energy, at a frequency $f_0$ near the resonance frequency of the gyromagnetic bodies, to a radio frequency coil within the probe to produce a radio frequency magnetic field $H_1$ within the sample at right angles to the polarizing magnetic field $H_0$. A variable frequency audio field modulator 5 supplies an output of precisely predetermined audio frequency to a field modulation coil 6 for modulating the polarizing magnetic field $H_0$ at a predetermined audio frequency. This can also be thought of as superimposing a modulating field $H_m$, at the audio frequency, upon the polarizing magnetic field. The frequency of the audio frequency modulation is adjusted such that the frequency of the radio frequency energy plus or minus the field modulation frequency equals the resonance frequency of the sample under analysis. When these conditions are met a radio frequency sideband is produced in the sample at the resonance frequency of the sample for exciting the sample into resonance.

At resonance, the sample emits radio frequency energy, at its resonance frequency, which is picked up in a radio frequency detector coil within the probe 2 and fed to a radio frequency receiver 7. The receiver amplifies the radio frequency signal and feeds it to a phase sensitive detector 8 wherein it is compared with a sample of the transmitter radio frequency signal to obtain an audio frequency output which is fed to an audio frequency amplifier 9 and thence to one input of an audio phase detector 11. In the phase detector 11, the audio resonance signal is compared with a sample of the audio field modulation frequency to produce a DC resonance signal which is fed to a recorder 12 to be recorded as a function of time or of the scanned frequency of the variable frequency modulator 5.

The frequency scan is obtained from a digital computer 13 which has been programmed according to a scan program 14 to scan the frequency of the audio frequency modulation through a predetermined spectrum of the sample under analysis. A Teletype 15 is employed to instruct the digital computer 13 as to what frequency to start its scan and at what frequency to stop the scan. The digital computer will also give a readout as to the frequencies scanned by the variable frequency audio field modulator by feeding an output to the Teletype 15. In order to obtain a very precise spectrum of a sample under analysis the computer 13 steps the variable frequency audio field modulator through a resonance line in very small discrete stable frequency increments, such as, for example, in steps of 2.5 millihertz. The details of the variable frequency modulator 5 will be described in greater detail below with regard to FIGS. 3–13.

Figure 2:
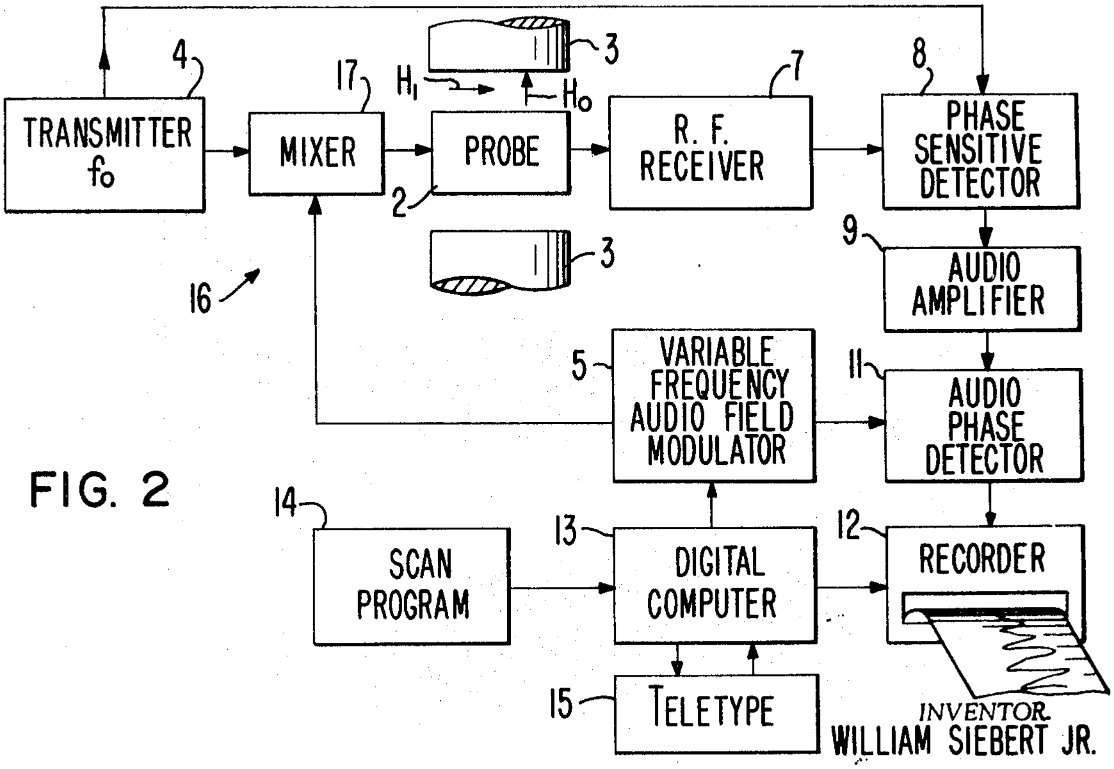
FIG. 2 is a schematic block diagram of a gyromagnetic resonance spectrometer employing alternative features of the present invention.

Referring now to FIG. 2, there is shown an alternative embodiment of a gyromagnetic resonance spectrometer 16. The spectrometer 16 is essentially the same as that of FIG. 1 with the exception that the sideband for exciting resonance of the sample of matter under investigation is not produced by modulation of the polarizing magnetic field $H_0$ but rather is produced by heterodyning the audio field modulation signal, derived from modulator 5, in a mixer 17 with the transmitter signal $f_0$ produce a radio frequency sideband at the resonance frequency of the sample, such sideband being fed to the RF transmitter coil within the probe 2 for exciting resonance of the sample.

Figure 3:
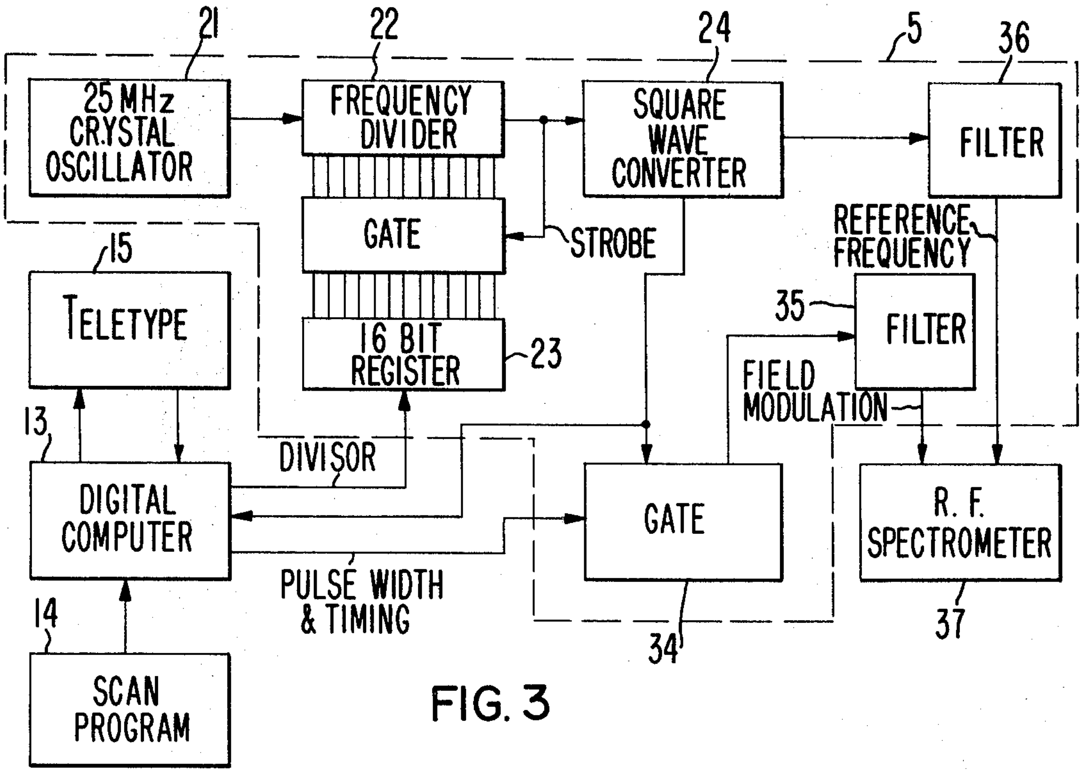
FIG. 3 is a schematic block diagram showing the details of the audio frequency generator of the present invention as employed with a gyromagnetic resonance spectrometer.
Figure 4:
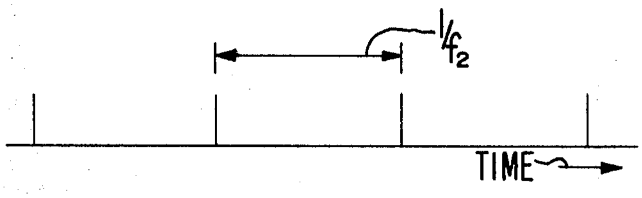
FIG. 4 is a waveform diagram depicting the quotient output of the frequency divider of FIG. 3.
Figure 5:
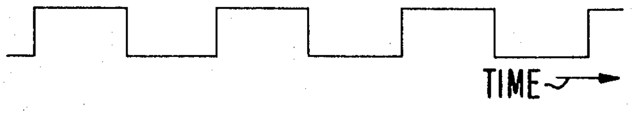
FIG. 5 is a waveform diagram depicting the output of the square wave converter of FIG. 3.

Referring now to FIGS. 3–5 there is shown a variable frequency audio field modulator 5 incorporating features of the present invention. More particularly, a radio frequency crystal oscillator 21 provides an extremely stable radio frequency dividend output signal at a relatively high frequency, as of 25 megahertz, to the input of a frequency divider 22 which divides the dividend frequency by a predetermined divisor number N to obtain a predetermined desired audio frequency subharmonic quotient output signal $f_2$, as indicated in the waveform of FIG. 4. The frequency divider 22 comprises a conventional ripple counter formed by the required number of flip-flops and associated gate circuits. A suitable commercially available integrated circuit including four flip-flops and four gates each is a Signetics N8281A device. The period of the audio frequency output waveform is $1/f_2$, where $f_2$ is the audio frequency output of the frequency divider 22 and the desired audio frequency output for the field modulator 5. The audio frequency $f_2$ is related to the crystal oscillator frequency $f_1$ and the divisor $N$ by the following expression:

$$N=(f_1/f_2)-8 \quad \text{Eq. (1)}$$

The desired audio output frequency $f_2$ is fed into the digital computer 13 via Teletype 15 and the digital computer may include a predetermined scan program. The digital computer solves the above equation )1) for the divisor N and enters the divisor in a 16-bit register 23. When the counter 22 reaches the end of its counting cycle a one shot multivibrator, not shown, will strobe the divisor $N$ into the counter from the register 23 and the counting cycle will repeat. The reason for the (−8) -8equation (1) is that it takes a finite time to strobe the divisor number N from the register 23 into the counter circuit 22, such as 320 nanoseconds. At a crystal oscillator dividend frequency $f_1$ of 25 MHz. the period of the RF signal is 40 nanoseconds and, therefore, eight counts are missed during the time it takes to transfer the divisor divisor N from the register 23 into the counter circuit 22. Thus the true divisor to be set into the frequency counter 22 must be reduced by the number of missed counts if the desired audio frequency $f_2$ is to be obtained at the output of the frequency divider 22. In other frequency dividers 22 having different transfer times, the number by which the true divisor must be reduced will vary according to the transfer time. The audio frequency quotient output $f_2$ of the frequency divider 22 is fed to a square wave converter 24 which is shown in greater detail in FIG. 6.

Figure 6:
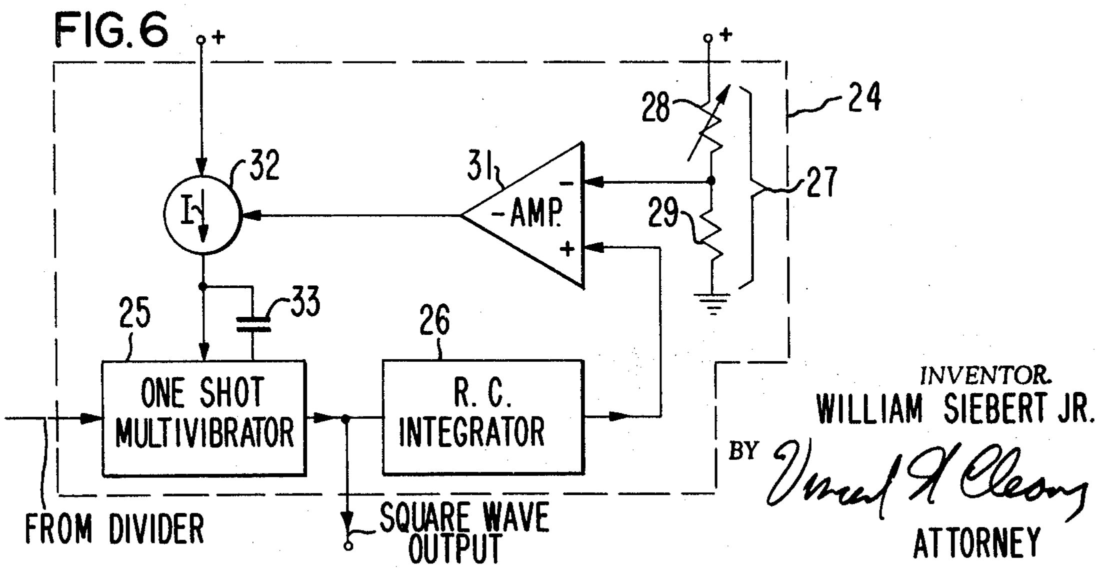
FIG. 6 is a schematic block diagram of the square wave converter portion of the circuit of FIG. 3.

Referring now to FIG. 6, the square wave converter 24 includes a one shot multivibrator 25, such as a Fairchild 9601 one-shot, which is triggered by the output spike from the frequency divider 22. The "on" time of the one shot multivibrator 25 is controlled to be equal to one-half of the period $1/f_2$ between the output pulses from the frequency divider 22 to produce a square waveform as shown in FIG. 5. This is accomplished by feeding the square wave output of the one-shot multivibrator to an RC integrator 26. The output of integrator 26 is always a fixed level when the "on" time is half the period and is compared to a reference voltage produced by a voltage divider 27. The voltage divider 27 includes a series connection of a variable resistor 28 and a fixed resistor 29 connected between a source of positive potential and ground.

The error signal obtained by the comparison of the integrator output and the voltage divider output is amplified in amplifier 31 and applied to the control electrode of a current source 32 for controlling the pulse width of the one-shot multivibrator 25. The input to the multivibrator includes a capacitor 33 which is charged with current from the current source 32 to control the "on" time of the one-shot multivibrator 25.

Referring now to FIG. 3, the square wave output of square wave converter 24 is fed via a gate 34 to a low pass filter 35 wherein the harmonics of the square wave are removed to produce a sinusoidal field modulation output signal having a fundamental frequency at the desired audio frequency $f_2$. The sinusoidal audio frequency $f_2$ is fed to the field modulation coil 6 or to the mixer 17 for use in the RF spectrometer 37 in the manner as previously described with regard to FIGS. 1 and 2.

Gate 34 is controlled by a signal derived from the digital computer 13 for controlling the pulse width and timing of the audio frequency modulation applied to the RF spectrometer. A sample of the square wave output is fed to the digital computer 13 for disabling transfer of the divisor N to the register 23 during the time that the register number is being transferred via the strobe to the frequency divider 22 in order to prevent inserting a wrong number into the countercircuit 22.

Another output of the square wave converter 24, at 2, audio frequency $f_2$. is fed to a second low pass filter 36 for removing the harmonics to derive a second sinusoidal audio frequency $f_2$ which is employed as a reference frequency in the RF spectrometer 37, such reference frequency, for example, being the signal fed to the audio phase detector 11 in the spectrometers of FIGS. 1 and 2.

The smallest frequency step of the audio frequency output $f_2$ is determined by the smallest change in the number N. This number can only be changed by one digit which is the least significant number. At an audio frequency $f_2$ of 5 kilohertz the smallest frequency step is on the order of 1 Hz. where the crystal frequency is 25 megahertz. The smallest step for an audio frequency $f_2$ of 250 hertz is 2.5 $10^{13}$ Hz. Thus, it is seen that the size of the smallest frequency step varies as the square of the audio frequency.

In a typical spectrometer, as shown in FIGS. 1 and 2, the operator selects the desired starting audio frequency $f_2$ by instructing the digital computer to produce a selected $f_2$. The computer 13 is instructed by the operator typing the message to the computer via the Teletype 15. The Teletype message to the digital computer 13 may also include instructions to start a frequency scan of the audio frequency $f_2$, such frequency scan being in certain increments, such as the smallest frequency step. The scan program 14 instructs the digital computer to step the audio frequency $f_2$ in the selected increments at a selected predetermined rate, such as one frequency step every few seconds for scanning through a spectral line of the sample under analysis.

Figure 7:
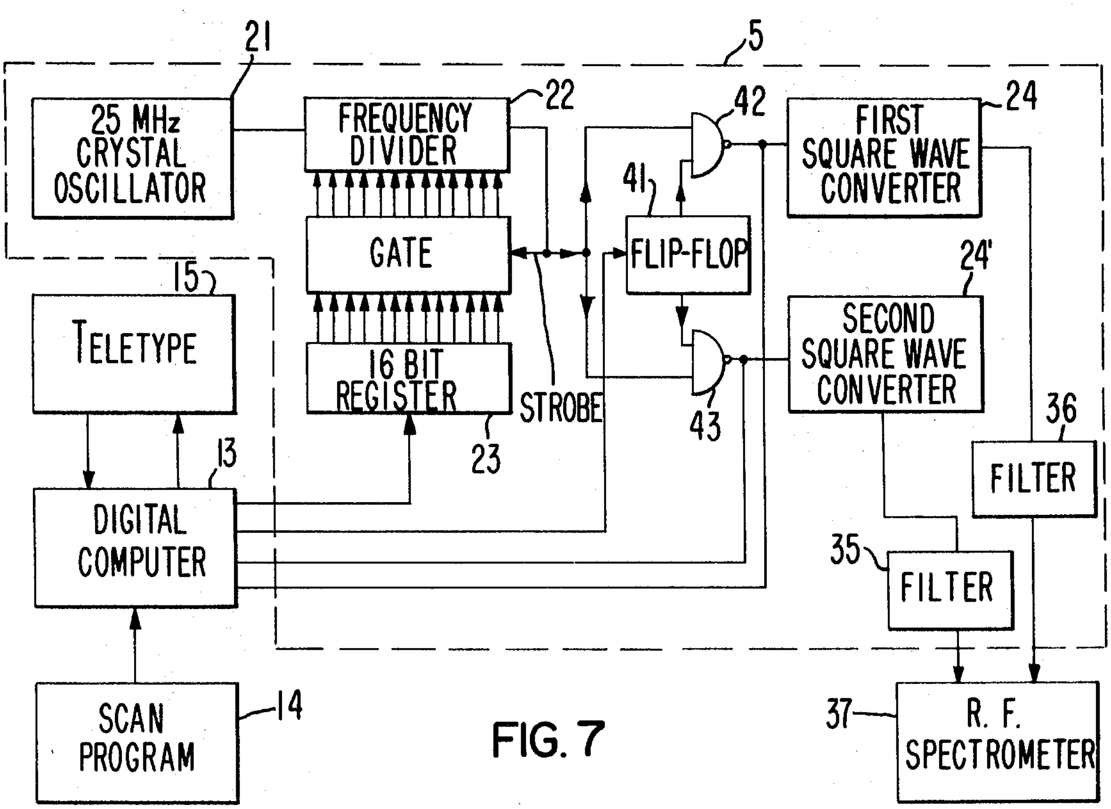
FIG. 7 is a schematic block diagram of an alternative embodiment to the circuit of FIG. 3 for producing a pair of variably phase displaced audio frequency outputs.

In an RF spectrometer it is often desired to provide two audio frequency outputs of the same frequency which are displaced in phase by a predetermined phase angle $\theta$, such phase angle $\theta$ being adjustable as desired. The audio frequency generator 5 as controlled by the computer is readily adaptable to such usage. More specifically, such an audio frequency field modulator 5 is shown in FIGS. 7–12. The circuit of FIG. 7 is substantially the same as that of FIG. 3 with the exception that the computer 13 splits the divisor number N into two parts n and m according to the following relation:

$$n+m=N \quad \text{Eq. (2)}$$

Figures 8, 9, 10, 11, 12:
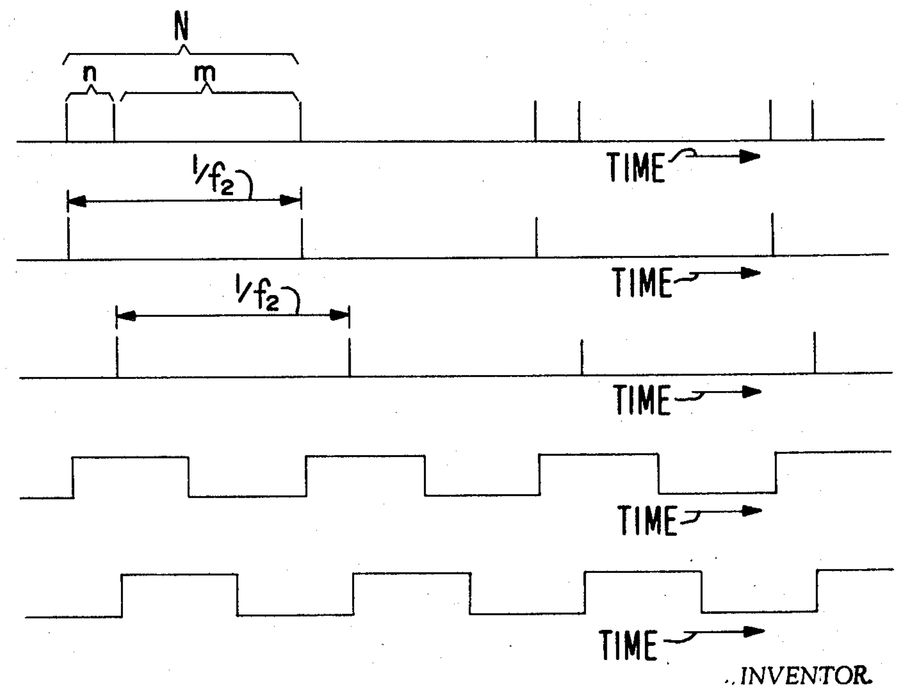
FIG. 8 is a waveform diagram depicting the waveform output of the frequency divider in the circuit of FIG. 7
FIG. 9 is a waveform diagram depicting the signal fed to one of the square wave converters in the circuit of FIG. 7.
FIG. 10 is a waveform diagram depicting the waveform fed to the second square wave converter of FIG. 7.
FIG. 11 is a waveform diagram depicting the waveform output of the first square wave converter of FIG. 7.
FIG. 12 is a waveform diagram depicting the square wave output of the second square wave converter of FIG. 7.

The computer 13 will have to take the missed count number into account when it computes the proper divisor numbers *n*, and *m*. The divisor number *N* is derived from equation (1), above, without regard for the missed count number and determines the audio frequency $f_2$ of the output of the audio frequency generator. The divisor numbers *n* and *m* are placed into the register 23 alternatively to produce a train of output signals as shown in the signal trace of FIG. 8. The numbers *N*, *n*, and *m* as shown in the trace determine the respective periods between successive pulses. The output train of pulses shown in FIG. 8 actually corresponds to a superposition of two trains of pulses as indicated in FIGS. 9 and 10, each train having the same period, namely, $1/f_2$ where $f_2$ is the desired output audio frequency. The phase shift between the two trains of pulses of FIGS. 9 and 10 is determined by the following relation:

$$\theta+2\,(n/N). \qquad \text{(Eq. 3)}$$

The quotient output of the frequency divider 22 includes the superposition of the two trains of output pulses. Each train has a period of $1/f_2$ and is displaced by the phase angle $\theta$, and is fed to a circuit which separates the pulses into two separate wave trains of FIGS. 9 and 10. The separated wave trains are fed to the input of a first and second square wave converter 24 and 24', respectively, for converting the trains of pulses into the phase displaced square wave outputs of FIGS. 11 and 12 which are then filtered in filters 35 and 36 to produce a phase displaced sinusoidal outputs supplied to the RF spectrometer 37.

The separator circuit includes a flip-flop 41 which controls a pair of AND gates 42 and 43, respectively, to which the output of the frequency divider 22 is fed. Flip-flop 41 is controlled by the digital computer 13 such that on the insertion of a given number into the register 23, flip-flop 41 is switched to a first position for passing the output of the frequency divider 22 to the first square wave converter 24 and upon insertion of the second number into the register 23 the flip-flop 41 is switched to the second position for switching the second output pulse to the second square wave converter 24'. In this manner, the two wave trains of FIGS. 9 and 10 are separated to produce the two square wave trains as shown in FIGS. 11 and 12. The outputs of the respective AND gates 42 and 43 are sensed and fed to the digital computer 13 to prevent the digital computer from feeding a new number into the register 23 during the time that the frequency divider 22 is transferring the divisor from the register 23 into the counter circuit 22. The phase shiftable audio field modulator 5 of FIG. 7 is particularly useful for pulsed gyromagnetic resonance spectrometers where the phase of one of the audio output signals must be changed frequently.

Figure 13:
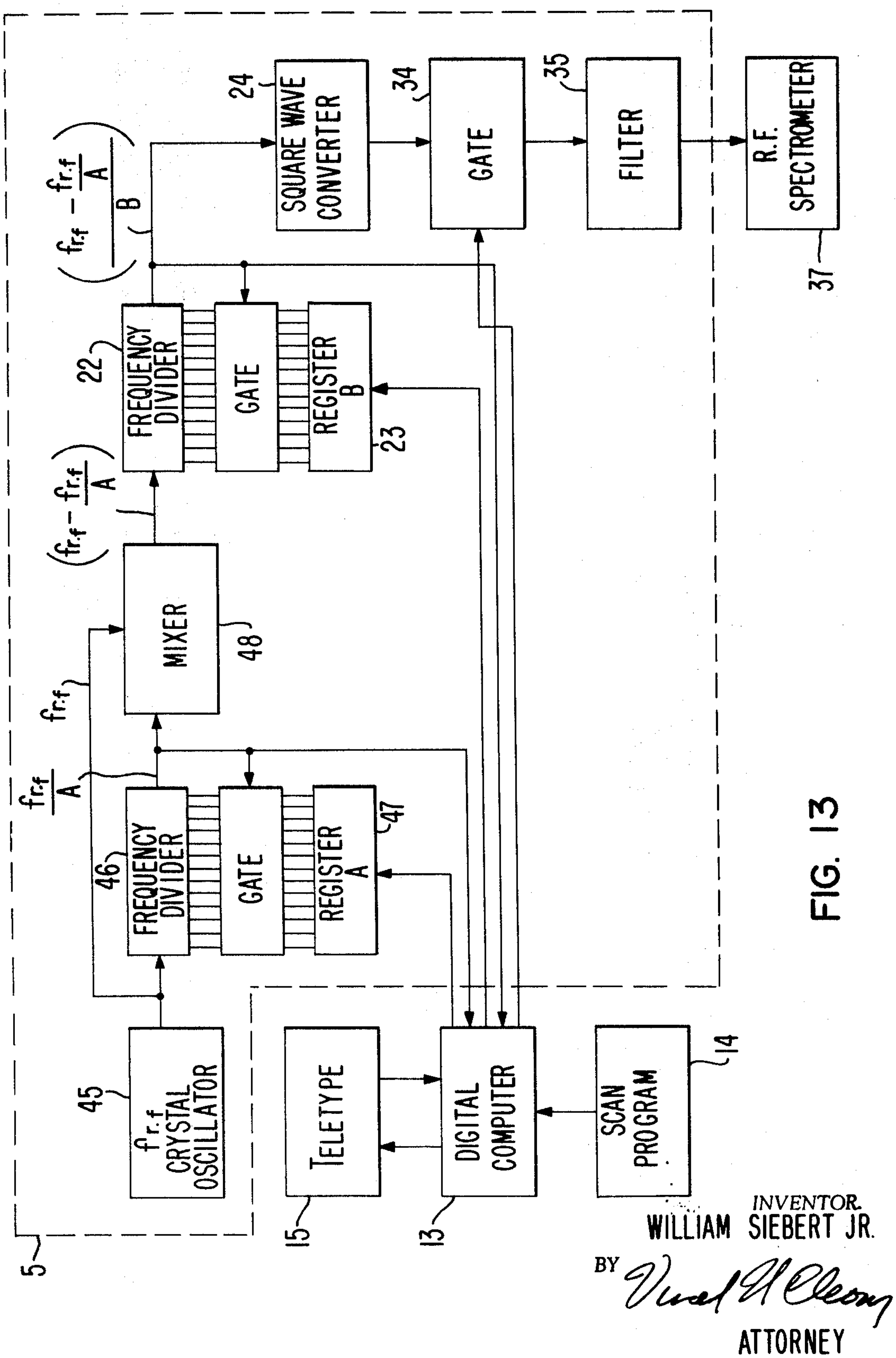
FIG. 13 is a circuit diagram similar to that of FIGS. 3 and 7 depicting an alternative audio frequency generator circuit wherein the audio output frequency is steppable in smaller discrete frequency increments.

Referring now to FIG. 13, there is shown an alternative embodiment of the audio field modulator 5 of the present invention wherein a finer control over the size of the smallest frequency step is obtained. The variable frequency audio field modulator 5 of FIG. 13 is substantially the same as the previously described with FIG. 3 within the exception that the dividend reference radio frequency signal applied to the divider 22 corresponds to a audio frequency sideband which is steppable in discrete frequency increments. More particularly, a reference radio frequency oscillator 45 provides a fixed reference radio frequency signal $f_{RF}$ which is fed to a second frequency divider 46 for division by a second divisor A which has been entered into a second register 47 from the computer 13 to produce a second audio frequency output equal to $fRF_A$ The audio frequency output $fRF/_A$ is heterodyned in mixer 48 with a sample of the radio frequency reference $f_{RF}$ derived from the oscillator 45 to produce a radio frequency sideband of a frequency $(f_{RF}\text{-}f_{RF/A})$ serving as the dividend input to the second frequency divider 22 for division by the first division B to produce the desired audio frequency output $$\frac{\left(f_{r.t.}-\frac{f_{r.t.}}{A}\right)}{B}$$

which is thence fed to the square wave converter 24 to produce a square wave output which is gated, filtered and thence fed to the spectrometer 37. The digital computer 13 calculates the required divisors A and B to produce the desired audio output frequency $$\frac{\left(f_{r.t.}-\frac{f_{r.t.}}{A}\right)}{B}$$

The smallest frequency step is determined by one digit change in divisor A. In a typical example, an output audio frequency $f_2$ of 100 kilohertz can be stepped in 0.1 $10^{13}$ Hz. assuming the crystal oscillator frequency $f_{RF}$ is 25 MHz.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radio frequency spectrometer; means for generating radio frequency energy and a DC magnetic field and for applying same to a sample of matter; audio frequency generator means for generating audio frequency energy; modulator means for modulating either the radio frequency energy or the DC magnetic field with the audio frequency output of said audio frequency generator to produce a sideband of the radio frequency energy at the resonance frequency of the sample for exciting resonance of the sample, THE IMPROVEMENT WHEREIN, said audio frequency generator means includes, means for generating a reference radio frequency dividend signal, counter means operable upon the reference audio frequency dividend signal for dividing the reference dividend signal by a certain divisor to obtain an audio frequency quotient output determinative of the frequency of the audio frequency output of said audio frequency generator; computer means responsible to an input determinative of the desired audio frequency of the audio frequency generator for calculating the divisor; and transfer means for sequentially transferring the divisor from said computer means and setting same into said counter means.

2. The apparatus of claim 1 including, register means coupled to the output of said computer for storing the divisor, and wherein said transfer means transfers said divisor from said register means to said counter.

3. The apparatus of claim 1 including, square wave generator means coupled to the output of said divider means for generating a square wave having a frequency determined by the quotient output of said counter means.

4. The apparatus of claim 3 including filter means connected between said square wave generator means and said field modulator means for removing harmonics from said square wave output to obtain a sinusoidal fundamental frequency output for applying to said modulator means.

5. The apparatus of claim 1 wherein said computer means calculates a set of two dividers which are alternately transferred by said transfer means into said counter to produce two sets of time displaced quotient outputs determinative of two phase displaced audio signals of the same frequency, selector means connected to receive the quotient outputs of said counter means for separating one set of quotient outputs from the other set, and means responsive to the separated quotient outputs for generating a pair of separate phase displaced audio signals of the same frequency.

6. The apparatus of claim 1 wherein said means for generating the reference radio frequency dividend input to said counter means includes, a source of a second radio frequency dividend signal, a second counter means operable on the second radio frequency dividend signal for dividing the second dividend signal by a certain second divisor to obtain a second audio frequency quotient output, means for mixing the second radio frequency dividend signal with the second audio frequency quotient output to obtain the first radio frequency dividend signal input to said first counter means, and wherein said computer means is responsive to an input determinative of the desired first audio frequency quotient output of said audio frequency generator for calculating the second divisor, and second transfer means for sequentially transferring the second divisor from said computer means and setting same into said second counter means.